United States Patent
Turner et al.

(10) Patent No.: US 7,086,983 B2
(45) Date of Patent: Aug. 8, 2006

(54) DIFFERENTIAL WITH PINION BEARINGS SUPPORTED ON INPUT YOKE

(75) Inventors: Gary Turner, Three Rivers, MI (US);
Leo Wenstrup, Portage, MI (US);
David Thompson, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 60 days.

(21) Appl. No.: 10/823,479

(22) Filed: Apr. 13, 2004

(65) Prior Publication Data
US 2004/0259676 A1 Dec. 23, 2004

Related U.S. Application Data

(63) Continuation-in-part of application No. 10/033,253, filed on Oct. 25, 2001, now Pat. No. 6,719,661.

(51) Int. Cl.
*F16H 48/06* (2006.01)
*F16H 1/14* (2006.01)

(52) U.S. Cl. .......................... 475/230; 475/220; 74/424

(58) Field of Classification Search ................ 475/220, 475/230; 74/416–7, 423–4
See application file for complete search history.

(56) References Cited

U.S. PATENT DOCUMENTS

| | | | |
|---|---|---|---|
| 904,774 A * | 11/1908 | Gulick | 475/230 |
| 1,106,149 A | 8/1914 | Loomis | |
| 1,657,510 A | 1/1928 | Leipert | |
| 2,019,464 A * | 10/1935 | Riblet | 74/424 |
| 2,147,145 A | 2/1939 | Carlson et al. | |
| 2,178,900 A | 11/1939 | Starr | |
| 2,219,025 A * | 10/1940 | Vanderberg | 475/246 |
| 2,383,954 A * | 9/1945 | Buckendale et al. | 475/220 |
| 3,015,970 A | 1/1962 | Mueller | |
| 3,572,154 A | 3/1971 | Bartolomucci | |
| 4,095,675 A | 6/1978 | Bell | |
| 4,227,427 A | 10/1980 | Dick | |
| 4,468,981 A * | 9/1984 | Ries | 475/225 |
| 4,733,578 A | 3/1988 | Glaze et al. | |
| 5,098,355 A | 3/1992 | Long | |
| 5,114,248 A | 5/1992 | Harsdorff | |
| 5,913,745 A | 6/1999 | Inagaki et al. | |
| 6,093,127 A | 7/2000 | DiDomenico et al. | |
| 6,514,169 B1 | 2/2003 | Turner et al. | |

FOREIGN PATENT DOCUMENTS

EP 000428075 A2 * 5/1991 .................. 74/417

* cited by examiner

*Primary Examiner*—Roger Pang
(74) *Attorney, Agent, or Firm*—Dykema Gossett PLLC

(57) ABSTRACT

A differential having pinion bearings supported on the input yoke is provided. The differential includes a housing having an opening through which a pinion shaft extends. The input yoke is disposed about a portion of the pinion shaft and one or both pinion bearing sets are then disposed about the input yoke. This configuration reduces pinion standout and allows for installation of a pre-assembled bearing pack (i.e., without spacers or shims), but does not reduce the length of the splines on the input yoke or bearing capacity.

8 Claims, 2 Drawing Sheets

DIFFERENTIAL WITH PINION BEARINGS SUPPORTED ON INPUT YOKE

This application is a continuation-in-part application of U.S. patent application Ser. No. 10/033,253 filed Oct. 25, 2001 now U.S. Pat. No. 6,719,661.

BACKGROUND OF THE INVENTION

1. Field of the Invention

This invention relates to vehicle differentials and, in particular, to the location and support of pinion bearings within a differential.

2. Discussion of Related Art

Differentials are used in vehicles to allow wheels mounted on either side of a vehicle axle to rotate at different speeds. A conventional differential includes a series of gears disposed within a differential housing that transmit torque from a power input shaft to axle half shafts supporting the wheels. One of these gears is a pinion gear. The differential housing defines an opening through which a pinion shaft extends to support the pinion gear. Bearings are disposed within the opening to allow the pinion shaft to rotate relative to the housing. An input yoke is coupled to the pinion shaft and to the power input shaft to transmit torque from the power input shaft to the pinion shaft.

Conventional differentials have several problems. First, the pinion shaft and input yoke extend outwardly from the differential housing for a relatively large distance ("pinion standout"). As a result, the differential requires additional space and the mounting of vehicle suspension components and other vehicle components is made for difficult. Second, installation and proper placement of the pinion bearings often require the use of spacers or shims during assembly thereby increasing assembly time.

There is thus a need for a differential for a vehicle that will minimize or eliminate one or more of the above-mentioned deficiencies.

SUMMARY OF THE INVENTION

The present invention provides a differential for a vehicle.

A differential in accordance with one embodiment of the present invention includes a differential housing that defines a first opening. The differential also includes a pinion shaft disposed within the first opening and configured for rotation about an axis extending through the first opening. The differential further includes an input yoke disposed about a least a portion of the pinion shaft. Finally, the differential includes a first bearing set disposed about the input yoke. The differential may also include a second bearing set axially spaced from the first bearing set and also disposed about the input yoke.

A differential in accordance with another embodiment of the present invention includes differential housing defining a first opening and a pinion shaft disposed within the first opening and configured for rotation about an axis extending through the first opening. The differential further includes a pinion gear mounted on the pinion shaft and an input yoke disposed about a portion of the pinion shaft. The differential further includes a first bearing set disposed about the input yoke and having a bearing cone in engagement with the input yoke and a second bearing set axially spaced from the first bearing set and having a bearing cone in engagement with the pinion shaft.

A differential in accordance with the present invention has several advantages as compared to conventional vehicle differentials. The location of the bearing set(s) on the input yoke shortens the overall length of the pinion shaft while still allowing sufficient engagement between the pinion shaft and input yoke. As a result, pinion standout is reduced. The location of the bearing sets further allows the use of a preassembled bearing pack comprised of the bearing sets and a carrier for the bearing sets for proper positioning of the bearing sets within the differential housing opening. As a result, spacers and/or shims are not required and differential assembly time may be significantly reduced.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
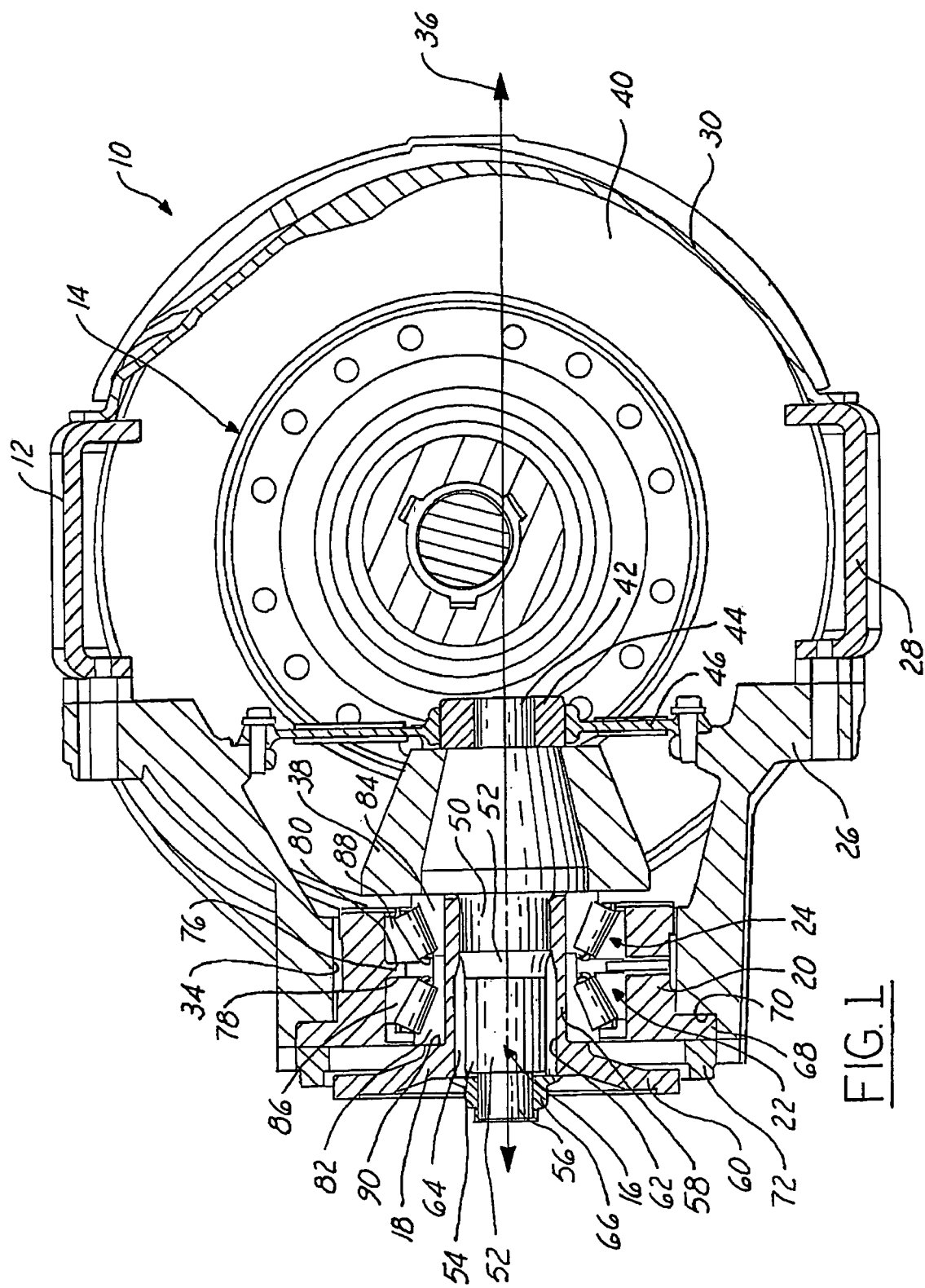
FIG. 1 is a sectional view of a differential in accordance with one embodiment of the present invention.

Referring now to the drawings wherein like reference numerals are used to identify identical components in the various views, FIG. 1 illustrates a differential 10 in accordance with one embodiment of the present invention. Differential 10 is provided to allow wheels (not shown) disposed on either side of the vehicle, and supported on axle half shafts (not shown) extending from differential 10, to rotate at different speeds. Differential 10 is particularly adapted for use in a heavy truck. It should be understood, however, that the present invention is not limited to use in heavy trucks and may be used in a wide variety of vehicles. Differential 10 may include a housing 12, a differential gear assembly 14, a pinion shaft 16, an input yoke 18, a carrier 20, and bearing sets 22, 24.

Housing 12 provides structural support for the other components of differential 10. Housing 12 also protects the other components of differential 10 from foreign objects and elements. Housing 12 may be made from conventional metals and metal alloys such as steel and may include multiple members 26, 28, 30 that are sized relative to components of differential 10 and coupled together using conventional fasteners (not shown). Member 26 of housing may define an opening 34 at a forward end. Opening 34 may be centered about an axis 36 extending through pinion shaft 16.

Differential gear assembly 14 is provided to allow the wheels supported on either side of the vehicle to rotate at different speeds. Assembly 14 may include a pinion gear 38, a ring gear 40, and a conventional bevel gear set (not shown) disposed within a differential carrier (not shown).

Pinion gear 38 is provided to transfer torque from pinion shaft 16 to ring gear 40. Pinion gear 38 may be made from conventional metals and metal alloys and may comprise a hypoid gear. Gear 38 rotates about axis 36. Gear 38 is disposed about shaft 165 and may be integral therewith or mounted thereto using a conventional spline connection or in other ways customary in the art. Gear 38 may also include a pilot portion 42 extending rearwardly that is supported for rotation by bearings 44 disposed in a pilot web 46 of housing member 26.

Ring gear 40 is provided to transfer torque from pinion gear 38 to the bevel gear set and is conventional in the art. Ring gear 40 may also be made from conventional metals and metal alloys and may also comprise a hypoid gear. Gear 40 is affixed to the carrier or may be integral therewith.

The bevel gear set (not shown) is provided to transfer torque from ring gear 40 to the axle half shafts supporting the vehicle wheels. The bevel gear set is conventional in the art.

Pinion shaft 16 is provided to transmit power from a power input shaft (not shown) to pinion gear 38 and is conventional in the art. Pinion shaft 16 may include a first portion 48 having a first diameter, a second portion 50 having a second diameter greater than the first diameter and a tapered portion 52 joining portions 48, 50. Pinion shaft 16 may include a plurality of splines 54 extending axially along portion 48 from a forward end of shaft 16 to tapered portion 52. Pinion shaft 16 may also include a threaded shank 56 extending from a forward end of shaft 16 and integral therewith.

Input yoke 18 is provided to transmit power from a power input shaft (not shown) to pinion shaft 16. Yoke 18 may be coupled to the power input shaft through a conventional universal joint (not shown) and is configured for rotation about axis 36. Yoke 18 includes a generally cylindrical body 58 with a circular flange 60 radiating outwardly from body 58 at a forward end of body 58. Body 58 defines a bore 62 sized to receive pinion shaft 16 and extends axially along shaft 16 to the rearward end of shaft 16 such that one axial end of yoke 18 is proximate pinion gear 38. Yoke 18 may include a plurality of splines 64 configured for engagement with splines 54 of pinion shaft 16. In accordance with the present invention, splines 64 may be disposed radially inwardly of bearing set 22. Yoke 18 may be retained on shaft 16 by a nut 66 and a washer (not shown) disposed about stud 56 of shaft 16.

Carrier 20 is provided to position and support bearing sets 22, 24 within opening 34 of housing 12 and may be made from conventional metals or metal alloys. Carrier 20 is generally cylindrical in shape and is sized to be received within opening 34 of housing 12. Carrier 20 includes a radially outwardly extending flange 68 at a forward end that abuts a shoulder 70 formed in housing 12 upon installation of carrier 20 within opening 34. Carrier 20 may be held within opening 34 by a cap 72 that is fastened to member 26 of housing 12 using conventional fasteners (not shown). Carrier 20 is disposed about axis 36 and defines a bore 74 configured to receive bearing sets 22, 24. A radially inwardly extending flange 76 within bore 74 defines a pair of shoulders 78, 80 and helps enable proper positioning of bearing sets 22, 24 without the need for spacers or shims.

Bearings sets 22, 24 are provided to allow rotation of input yoke 18 and pinion shaft 16 relative to carrier 20 and housing 12. Bearing sets 22, 24 are conventional in the art and may comprise tapered roller bearings. Each bearing set 22, 24 includes a cone 82, 84, respectively, defining an inner bearing race and a cup 86, 88, respectively, defining an outer bearing race. Cone 82 of bearing set 22 is in engagement with a shoulder 90 defined in input yoke 18 and cup 86 of bearing set 22 is in engagement with shoulder 78 of carrier 20. Cone 84 of bearing set 24 is in engagement with pinion gear 38 while cup 88 of bearing set 24 is in engagement with shoulder 80 of carrier 20. In accordance with the present invention, bearing sets 22, 24 are disposed about input yoke 18 between yoke 18 and carrier 20. In particular, cones 82, 84 are supported on body 58 of yoke 18. The relative location of bearing sets 22, 24 and input yoke 18 result in a significant improvement as compared to conventional differentials. In particular, yoke 18 is moved forward in differential 10 thereby enabling a reduction in pinion standout, but still allowing yoke 18 to maintain proper engagement with pinion shaft 16 because the lengths of splines 54, 64 are not reduced. Further, bearing capacity remains the same in the inventive differential.

Figure 2:
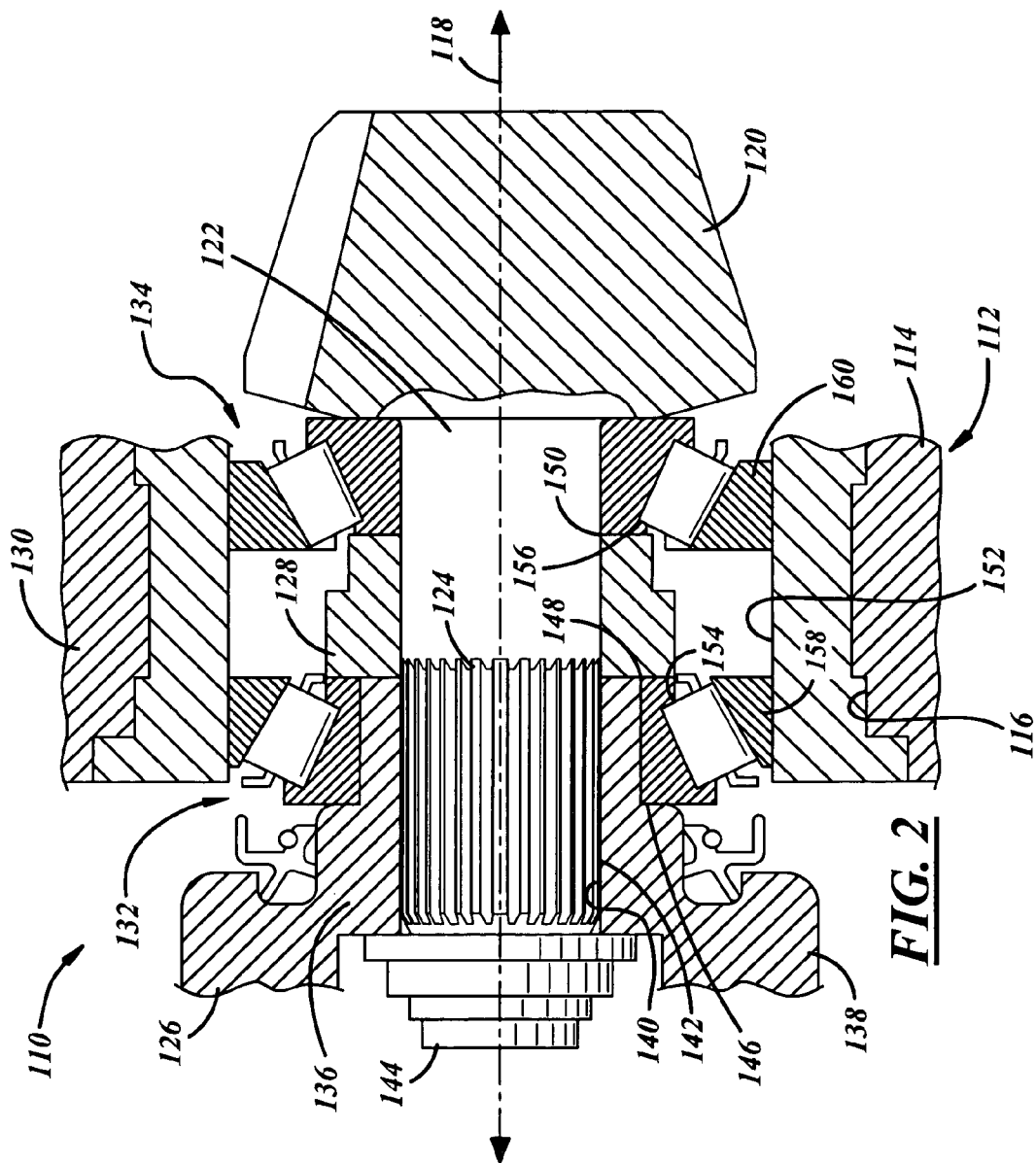
FIG. 2 is a partial sectional view of a differential in accordance with another embodiment of the present invention.

Referring now to FIG. 2, a differential 110 in accordance with another embodiment of the present invention is illustrated. Differential 110 includes may include many components that are substantially similar to components found in differential 10 described hereinabove including, for example: (i) a housing 112 having a member 114 defining an opening 116 at a forward end centered about an axis 118; (ii) a differential gear assembly including a pinion gear 120; and (iii) a pinion shaft 122 configured for rotation about axis 118 and having a plurality of axially extending splines 124. Accordingly, additional information regarding these components may be obtained hereinabove. Differential 110 may further includes an input yoke 126, a spacer 128, a carrier 130, and bearing sets 132, 134.

Input yoke 126 is provided to transmit power from a power input shaft (not shown) to pinion shaft 122. Yoke 126 may be coupled to the power input shaft through a conventional universal joint (not shown) and is configured for rotation about axis 118. Yoke 126 includes a generally cylindrical body 136 with a circular flange 138 radiating outwardly from body 136 at a forward end of body 136. Body 136 defines a bore 140 sized to receive pinion shaft 122 and extends axially along shaft 122, terminating at a point intermediate the forward and rearward ends of pinion shaft 122. Yoke 126 may include a plurality of splines 142 configured for engagement with splines 124 of pinion shaft 122. In accordance with the present invention, splines 124 may be disposed radially inwardly of bearing set 132. Yoke 126 may be retained on shaft 122 by a nut (not shown) and a washer (not shown) disposed about a threaded stud 144 extending from the forward end of shaft 122. Yoke 126 has a stepped outer diameter defining a shoulder 146 for a purpose described hereinbelow.

Spacer 128 is provided to set bearing preload and maintain the position of bearing sets 132, 134. Spacer 128 is disposed between bearing sets 132, 134 and also between input yoke 126 and bearing set 134. Spacer 128 has a central bore configured to receive pinion shaft 122 and may have a stepped outer diameter as shown in the illustrated embodiment. Together with yoke 126, the forward end of spacer 128 defines a shoulder 148 for a purpose described hereinbelow. Similarly, the rearward end of spacer 128, together with pinion shaft 122, defines a shoulder 150 for a purpose described hereinbelow.

Carrier 130 is provided to position and support bearing sets 132, 134 within opening 116 of housing 112 and may be made from conventional metals or metal alloys. Carrier 130 is generally cylindrical in shape and is sized to be received within opening 116 of housing 112. Carrier 130 may be held within opening 116 by a cap (not shown) that is fastened to member 114 of housing 112 using conventional fasteners (not shown) as discussed hereinabove with reference to FIG. 1. Carrier 130 is disposed about axis 118 and defines a bore 152 configured to receive bearing sets 132, 134.

Bearings set 132, 134 are provided to allow rotation of input yoke 126 and pinion shaft 122 relative to carrier 130 and housing 112. Bearing sets 132, 134 are conventional in the art and may comprise tapered roller bearings. Each bearing set 132, 134 includes a cone 154, 156, respectively, defining an inner bearing race and a cup 158, 160, respectively, defining an outer bearing race. Cone 154 of bearing set 132 is disposed and retained between shoulders 146, 148, and may be in engagement with one or both of shoulders 146, 148. Cone 156 of bearing set 134 is disposed and retained between shoulder 150 and pinion gear 120 and may be in engagement with one or both of shoulder 150 and pinion gear 120. In accordance with the present invention, bearing set 132 is disposed about input yoke 126 between yoke 126 and carrier 130. In particular, cone 154 is supported on body 136 of yoke 126. The relative locations of bearing set 132 and input yoke 126 again results in a significant improvement as compared to conventional differentials. In particular, yoke 126 is moved forward in differential 110 thereby enabling a reduction in pinion standout, but still allowing yoke 126 to maintain proper engagement with pinion shaft 122 because the lengths of splines 142, 124, respectively, is not reduced. Further, bearing capacity remains the same in the inventive differential.

While the invention has been particularly shown and described with reference to the preferred embodiments thereof, it is well understood by those skilled in the art that various changes and modifications can be made in the invention without departing from the spirit and scope of the invention.

We claim:

1. A differential for a vehicle, comprising:
   a differential housing defining a first opening;
   a pinion shaft disposed within said first opening and configured for rotation about an axis extending through said first opening;
   a pinion gear mounted on said pinion shaft;
   an input yoke disposed about a portion of said pinion shaft;
   a first bearing set disposed about said input yoke and having a bearing cone in engagement with said input yoke; and,
   a second bearing set axially spaced from said first bearing set and having a bearing cone in engagement with said pinion shaft.

2. The differential of claim 1, further comprising a spacer disposed between said input yoke and said bearing cone of said second bearing set.

3. The differential of claim 2 wherein said bearing cone of said first bearing set is disposed between opposed shoulders formed in said input yoke and said spacer.

4. The differential of claim 2 wherein said bearing cone of said second bearing set is retained between said spacer and said pinion gear.

5. The differential of claim 4 wherein said bearing cone of said second bearing set engages said spacer and said pinion gear.

6. The differential of claim 1 wherein said input yoke includes a plurality of splines configured for engagement with a corresponding plurality of splines on said pinion shaft, said plurality of splines on said input yoke disposed radially inwardly of said first bearing set.

7. The differential of claim 1, further comprising a carrier disposed within said opening, radially outwardly of said input yoke.

8. The differential of claim 7 wherein said first bearing set is disposed between said carrier and said input yoke.

* * * * *